June 30, 1942.  W. BORBERG  2,287,965
METHOD AND APPARATUS FOR THE OPERATION OF PHOTOELECTRIC CELLS
Filed March 16, 1940  2 Sheets-Sheet 1

INVENTOR
Willy Borberg
BY
ATTORNEY

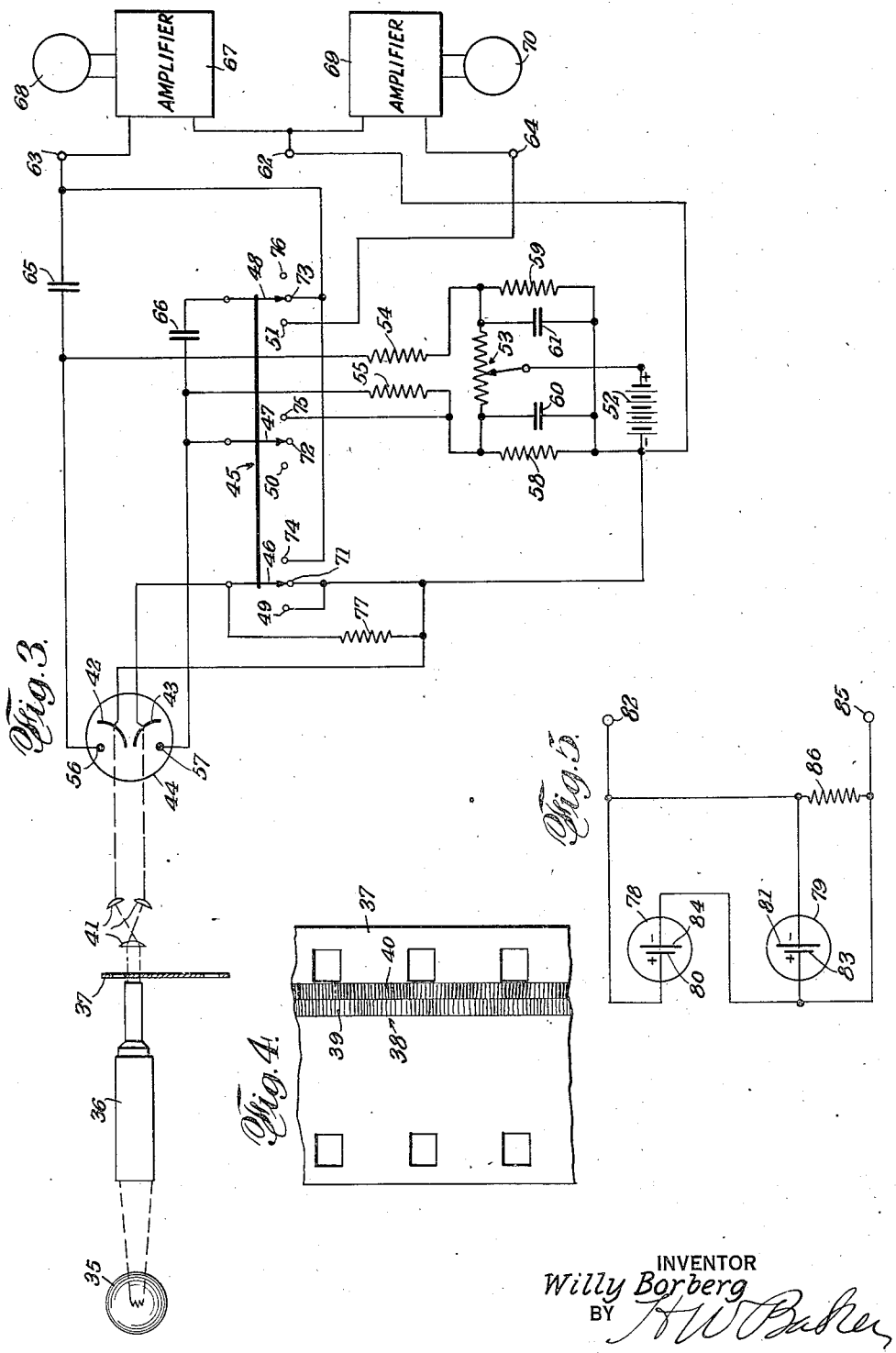

Patented June 30, 1942

2,287,965

UNITED STATES PATENT OFFICE 2,287,965

METHOD AND APPARATUS FOR THE OPERATION OF PHOTOELECTRIC CELLS

Willy Borberg, Astoria, Long Island, N. Y., assignor to International Projector Corporation, New York, N. Y., a corporation of Delaware Application March 16, 1940, Serial No. 324,272

4 Claims. (Cl. 179—100.3)

The present invention relates generally to a method and apparatus for translating light signals, for instance, such as those derived from a film sound track into corresponding electric signals.

It has been recognized that by recording light signals 180° out of phase with each other and translating them into electric signals in phase with each other, certain stray impulses will be eliminated from the signals. When the light signals are 180° out of phase, the recording from which said signals are derived is called a push pull recording. Photoelectric cells and electrical circuits connected therewith are employed in translating light signals into corresponding electrical signals and when the photoelectric cells and associated electrical circuits are adapted to translate light signals 180° out of phase with each other into electric signals in phase, such apparatus, including the photoelectric cells, is called a push-pull photoelectric cell circuit.

A feature of the present invention is the provision of a push-pull photoelectric cell circuit which retains all the advantages of such circuits, which are well known and which will therefore not be enumerated, while eliminating the transformer which has heretofore been considered a necessary part thereof. The elimination of the transformer results in the simplification of the circuit, greater freedom from inductive interference and disturbances resulting from mechanical vibrations, and the elimination of phase displacement inherent in transformer designs. In addition, the elimination of the transformer lowers substantially the manufacturing cost of such apparatus.

Another feature of the present invention is the provision of a more efficient circuit of the character described.

Present day sound reproducers for push-pull film sound tracks must also be capable of operating on standard tracks as many films are not supplied with push pull tracks. A feature of the present invention is therefore the provision of a circuit for both push-pull and standard operation.

Sound motion pictures, as presented today, are equipped with a single source of sound, a loud speaker usually placed centrally behind the screen. There is, therefore, no acoustic illusion of sound movement from one side of the screen to the other. To achieve this illusion of sound movement and to improve the quality and sense of reality of reproduced sound, experiments have been made in "stereophonic" recording and reproduction. In stereophonic recording separate recordings are made, with the microphones for the different recordings being placed at different points of the same scene. For instance, in stereophonically recording a large symphonic orchestra one microphone may be placed adjacent the string section, another adjacent the wind section and, if desired, other microphones may be placed at other vantage points. The sounds picked up by each microphone are then separately recorded as, for instance, on separate tracks of a single sound film.

In reproduction each separate track is separately translated into electric signals which are then transmitted to separate speakers arranged at different points in the auditorium. As a result of this type of recording and reproduction there is a marked improvement in quality and in the sense of reality in reproduced sound. A feature of the present invention is the provision of apparatus for reproducing stereophonic recordings, such apparatus including a photoelectric cell circuit.

Since, however, practically all commercial film recordings made today are either standard single track or push-pull recordings, a further feature of the present invention is the provision of apparatus that can be used with either single standard track recordings, push-pull recordings, or stereophonic recordings.

Other features and advantages of the present invention will become apparent from the following description and the drawings relating thereto.

Referring now to the drawings,

Fig. 3 is a schematic diagram of a sound reproducing system that may be employed for stereophonic, push-pull or standard recordings.

Fig. 4 is a schematic view of a stereophonic film.

Fig. 5 is a schematic diagram of a push-pull photoelectric cell circuit employing photo-voltaic cells.

Figure 1:
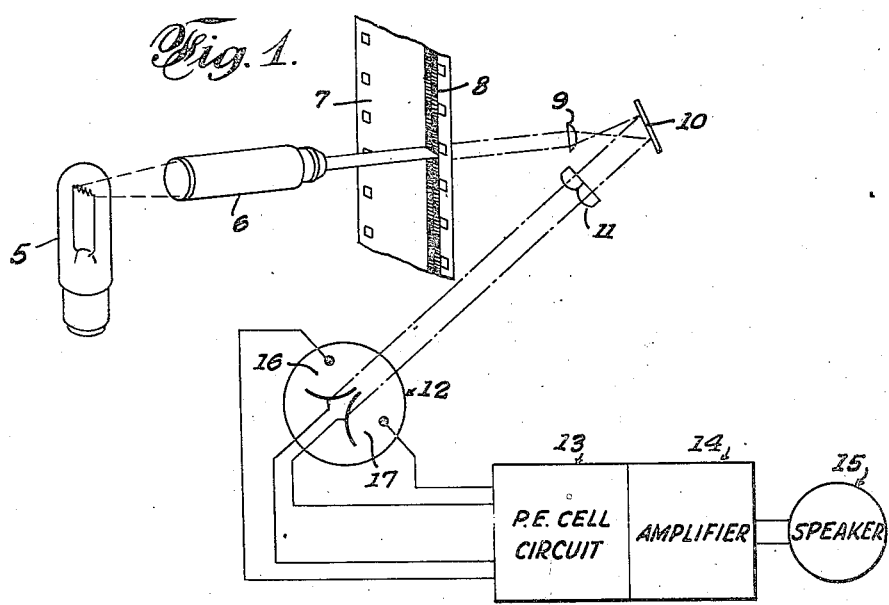
Fig. 1 is a schematic diagram illustrating the present invention in a sound reproducing system for push-pull as well as standard film recordings the said figure illustrating an optical system including a push-pull film track, and the relation of the photoelectric cell circuit of the present invention to both the optical system and the remainder of the sound reproducing system.

Referring now to Fig. 1, the light from an exciter lamp 5 may be directed by a suitable optical unit 6 through a film 7 having a sound recording track 8 arranged thereon. The sound recording track 8, being a push-pull track, is a double track and has two separate sets of recordings thereon. The track 8 illustrated in the drawings has sound recorded thereon by the variable density method. The present invention, however, may also be applied to tracks recorded by the variable area or variable width method.

In accordance with the usual practice in push-pull recording the two sets of recordings on track 8 are 180° out of phase and are adapted to be reunited as electrical impulses in phase by the photoelectric cell circuit.

In present day push-pull recording practice there are several general types of recording. In Class A push-pull recording the wave is fully or integrally recorded in each track, that is, each track may be a complete recording having half the total signal energy so that the two tracks are alike but out of phase. In Class B recording one half of the wave is recorded on the first track and the following half on the second track. In both cases the two tracks are recorded 180° out of phase with each other. Class AB recording consists of adjusting the recording mechanism to record Class A for low volume signals and Class B whenever the signal volume exceeds a given amount. Any of these types of recording may be employed with the present invention.

The beams of light passing through the double track 8 may be passed through an objective lens 9 which serves to direct the separate beams away from each other. A reflector 10 may be used to reflect the diverging beams through a lenticular device 11 which latter is known as a beam splitter. The lenticular device arranges the diverging beams passing therethrough in parallel and separately directs them to a twin photoelectric cell 12 where they impinge on separate cathodes.

It will be apparent that the same optical system may also be employed for single track standard film and that the optical system here described will direct the light signals therefrom to the twin photoelectric cell 12 in the same manner as hereinbefore described in connection with film 7.

While I have described in detail a specific optical system and a specific type of film, the present invention is not directed to the details thereof and it is to be understood that any suitable optical system, many types of which are known today, may be employed with any suitable type of recording.

The twin photoelectric cell 12 is connected in a photoelectric cell circuit 13 where the light signals are converted into electric signals which are passed through a suitable amplifier 14 and after amplification are converted into sound in a speaker 15.

Figure 2:
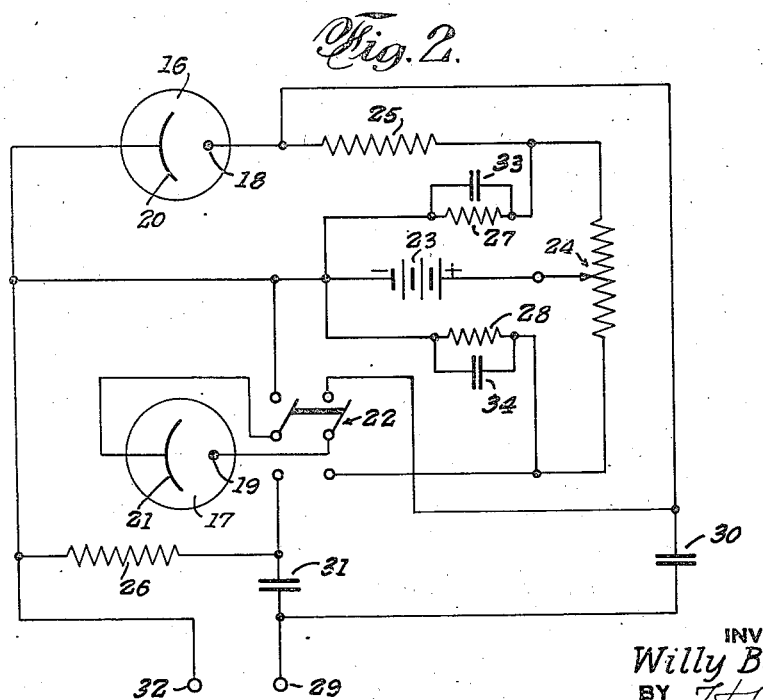
Fig. 2 is a schematic diagram of a photoelectric cell circuit embodying the present invention.

The twin photoelectric cell 12 consists of two individual photoelectric cells 16 and 17 which are arranged together within a single glass envelope. In place of the twin photoelectric cell 12 two entirely separated photoelectric cells may be employed and may be arranged adjacent to each other for receiving light beams from the lenticular device 11. The specific construction of such photoelectric cells being known, it will not be described here. The type of photoelectric cell intended by the schematic illustration in Figures 1, 2 and 3 is a photo-emissive cell and in Fig. 5 a photo-voltaic cell. The application of the present invention to other types of photoelectric cells such as the photo-conducting cell, and the photo-barrier cell will be apparent from the drawings and the description herein.

Referring now to Fig. 2, photoelectric cells 16 and 17 together forming twin photoelectric cell 12 are illustrated for the purpose of clarifying the description, as two separate cells and, as a matter of fact, may be two separate cells. Photoelectric cell 16 is provided with anode 18 and cathode 20 and photoelectric cell 17 is provided with anode 19 and cathode 21.

Since the photoelectric cells and the circuit are intended to be adapted for standard as well as push-pull recording, switching means for this purpose may be provided, the switch 22 herein provided for this purpose being of the double pole double throw variety. When the switch 22 is thrown into its lower position, as viewed in Fig. 2, the circuit is arranged for push-pull operation and when the switch is thrown into its upper position the circuit is arranged for standard operation.

The push-pull arrangement of the circuit in which the switch 22 is in its lower position as shown in Fig. 2 will now be described. Polarizing potential from a suitable source of current supply, such as a battery 23, is applied to the anodes of the photoelectric cells through a suitable potentiometer 24, one end of the potentiometer resistance being connected directly to anode 19, the other end of the potentiometer resistance being connected through a suitable voltage drop or load resistor 25 to the other anode 18.

The flow of direct current from the anode 18 to the cathode 20 is returned directly to the negative terminal of the battery 23. The flow of direct current from anode 19 to cathode 21 is returned to the negative terminal of battery 23 through a voltage drop or load resistor 26. To stabilize the polarizing potential to the cells, resistors 27 and 28 are provided, each of which connect a separate end of the potentiometer resistance to the negative terminal of battery 23, thus serving as bleeders.

The signal energy on anode 18 is delivered to the output by connecting anode 18 with output terminal 29. A blocking condenser 30 of suitable capacity is interposed in series between the output terminal 29 and anode 18 to by-pass the signal current while blocking the polarizing current. The electrical signal energy on cathode 21 is delivered to the same terminal 29 by connecting the cathode 21 to output terminal 29. A blocking condenser 31 may be interposed between cathode 21 and the output terminal 29. The electrical signal energy from cathode 20 of photoelectric cell 16 is delivered to the other output terminal 32 by connecting said cathode directly thereto. The electrical signal energy on the anode 19 of photoelectric cell 17 is delivered to output terminal 32 by providing a by-pass condenser 34 across the resistor 28.

It will be seen that in the push-pull arrangement of the circuit with switch 22 in its lower position that the electrical signal energy from the anode of each cell is joined with the electrical signal energy on the cathode of the other cell, each of these combinations of signal energy being lead to a separate output terminal. The output terminals 29 and 32 are connected to any suitable work load such as the grid and cathode of an amplifying tube in the amplifier 14. It will be seen that since the light signals impinging on photoelectric cells 16 and 17 are 180° out of phase the resulting electrical signal potential on the cathode of one cell is in phase with the electrical signal energy on the anode of the other cell. Thus, by joining the cathode signal energy of each cell with the anode signal energy of the other cell the electrical signal energy is combined in phase.

When the above described circuit is to be used for translating light signals that are in phase into electrical signals that are in phase, switch 22 is moved to the upper position as viewed in Fig. 2. In this position anodes 18 and 19 are connected directly together and to output terminal 29 through condenser 30 while cathodes 20 and 21 are also connected directly together and to output terminal 32. Since the light signals impinging on photoelectric cells 16 and 17 are in phase the electrical signal energy on the anodes of the cells will be in phase and the electrical signal energy on the cathodes will be in phase. Thus, by connecting the anodes together and the cathodes together, the full signal energy will be delivered to the output terminals 29 and 32. Blocking condenser 31 is now arranged across the output terminals 29 and 32 in series with load resistor 26 which now operates as an external load resistor.

From the foregoing description it will be apparent that the photoelectric cell circuit illustrated in Fig. 2 can be switched from push-pull operation to standard operation and vice-versa by merely operating switch 22.

A sound reproducing system which may be used for stereophonic, standard single track, or push-pull recordings is illustrated in Fig. 3.

Any suitable optical system may be employed in the sound head, the one illustrated comprising an exciter lamp 35 whose light is directed by a suitable optical unit 36 through the sound track of a film 37. The film 37 illustrated in Fig. 4 has a stereophonic sound track 38. The sound track 38 is divided in half, the two halves representing the different sounds picked up by separate microphones. For instance, if sound track 38 is a stereophonic recording of an orchestra, the left half 39 of this track might represent the sounds picked up by the microphone adjacent the string section and the right half 40 might represent the sound picked up by the microphone placed adjacent the wind section.

The light from each half track is separately directed by means of suitable lenses 41 to either two distinct photoelectric cells or to separate cathodes 42 and 43 of a twin photoelectric cell 44. The photoelectric cell circuit when used with stereophonically recorded film is arranged so that the separate light impulses are translated into separate electrical impulses and transmitted through suitable amplifiers to separate loud speakers.

Since the photoelectric cell circuit illustrated in Fig. 3 is to be adapted for use with any one of three kinds of sound recording, namely, standard, push-pull or stereophonic, a switch 45 is provided for suitably arranging the circuit for any of these three uses. Switch 45 is comprised of three movable arms 46, 47, and 48 mechanically interlocked so as to move together, but not electrically connected. Each arm is adapted to make contact with any one of three poles associated therewith. The switch 45 may be of the type known as a "Yaxley" switch such as described in Patent No. 1,975,247 or any other suitable switch.

When arms 46, 47, and 48 are arranged to make contact with poles 49, 50 and 51, respectively, the sound reproducing system and its photoelectric cell circuit is arranged for stereophonic reproduction.

With switch 44 in position for stereophonic reproduction the circuit is arranged as follows. The negative side of a source of polarizing potential 52 is connected directly to cathodes 42 and 43. The positive side of potential source 52 is connected to the arm of a potentiometer 53, the ends of the potentiometer resistance being connected in series with load resistors 54 and 55 to anodes 56 and 57, respectively, of photoelectric cell 44. Suitable bleeder resistors 58 and 59 are arranged between the negative side of the potential source 52 and the ends of the resistance of potentiometer 53. By-pass condensers 60 and 61 are arranged across bleeder resistors 58 and 59, respectively.

The signal energy from cathodes 42 and 43 is led to a common output terminal 62. The signal energy from anode 56 is led to output terminal 63, while the signal energy from anode 56 is led to output terminal 64. Direct current blocking condensers 65 and 66 are interposed in series between anode 56 and output terminal 63, and anode 57 and output terminal 64, respectively.

Output terminal 63 and common terminal 62 are connected to a suitable amplifier 67 which is in turn connected to a loud speaker system 68. Output terminal 64 and common terminal 62 are connected to amplifier 69 which is in turn connected to a separate loud speaker system 70. With switch 45 arranged in the position immediately above described it will be seen that the sound reproducing system fulfills the conditions for stereophonic reproduction.

When the sound reproducing system is to be used for standard reproduction, switch 45 is arranged so that arms 46, 47, and 48 make contact with poles 71, 72 and 73, respectively. The polarizing potential for the photoelectric cell 44 is supplied thereto by the same circuit described in connection with the stereophonic arrangement of the sound reproducing system. The signal energy from cathodes 42 and 43 is led to output terminal 62. The signal energy from anode 56 is led to output terminal 63 with blocking condenser 65 interposed in this connection. The signal energy from anode 57 is, however, in this instance led via arm 48 and pole 73, to output terminal 63. Blocking condenser 66 is interposed between anode 57 and output terminal 63. In this arrangement the total signal output is obtained at output terminals 62 and 63 and is led only to amplifier 67 and speaker system 68, amplifier 69 and speaker system 70 being inoperative.

When the sound reproducing system illustrated in Fig. 3 is to be used with push-pull recording, switch 45 is arranged so that arms 46, 47, and 48 make contact with poles 74, 75, and 76, respectively. The push-pull arrangement of the instance circuit is similar to that described in connection with Fig. 2 and its operation will readily be understood from the description made in connection with Fig. 2. Therefore, the present description will be limited to the changes in the circuit resulting from switching switch 45 from standard to push-pull operation.

Load resistor 55 is shorted when arm 47 makes contact with pole 75 and anode 57 is therefore directly connected to one end of the resistance of potentiometer 53. Cathode 43 is no longer directly connected to the negative side of the polarizing potential source 52 and to output terminal 62, the load resistor 77 being interposed in series therebetween. Cathode 43 furthermore is directly connected by means of switch arm 46 and pole 74 to output terminal 63 and the signal energy thereon is delivered directly to output terminal 63. Anode 57 which in the standard reproduction arrangement is connected to output terminal 63 is disconnected therefrom.

As in standard operation only one amplifier 67 and one loud speaker system 68 is employed, said amplifier and loud speaker system being connected to output terminals 62 and 63.

From the foregoing description it will be apparent that by operation of switch 45 the system illustrated in Fig. 3 may be arranged for standard push-pull or stereophonic reproduction.

Referring now to Fig. 5 a push-pull photoelectric circuit is there illustrated which employs photo-voltaic cells 78 and 79. With such cells a source of polarizing potential is not essential. The anode 80 of cell 78 is connected to the cathode 81 of cell 79 and to output terminal 82. The anode 83 of cell 79 and the cathode 84 of cell 78 are connected together and to output terminal 85. A suitable load resistor 86 is arranged between the two output terminals 82 and 85.

The photo-voltaic cell circuit illustrated in Fig. 5 is arranged in a sound reproducing system in the same position as the photoelectric cell circuit 13 illustrated in Fig. 1 or in place of the photoelectric cell circuit illustrated in Fig. 3, the cells in Fig. 1 and Fig. 3 being preferably of the photoemissive type although as stated hereinbefore, photo-conducting cells and photo-barrier cells may also be employed in similar circuits.

While a preferred embodiment of my invention has been described, it is to be understood that this description is not a limitation upon the scope of the invention, which is to be determined only by the appended claims.

I claim:

1. In a sound reproducing system for stereophonic recordings, a photoelectric cell circuit comprising a plurality of photoelectric cells, a source of polarizing potential connected to said cells, the cathodes of said cells being connected together and to a common output terminal, the anodes of the said cells being connected to separate output terminals said anodes being connected through separate amplifiers to separate speakers.

2. In a photoelectric cell circuit for stereophonic and standard recordings, a plurality of photoelectric cells, a source of polarizing potential connected to said cells, the cathodes of the said cells being connected together and to a common output terminal, the anodes of the cells being connected to separate output terminals, and switching means for connecting the anodes of the cells to the same output terminal.

3. In a photoelectric cell circuit for push-pull and stereophonic recordings, a plurality of photoelectric cells, a source of polarizing potential connected to said cells, the anode and cathode of a first cell being connected to separate output terminals, the anode of a second cell being connected to the cathode of the first cell, the cathode of the second cell being connected to the anode of the first cell, and switching means for connecting the cathode of the second cell to the cathode of the first cell and substantially simultaneously connecting the anode of the second cell to a separate output terminal.

4. In a photoelectric cell circuit for push-pull and stereophonic recordings, a plurality of photoelectric cells, a source of polarizing potential connected to said cells, the anode and cathode of a first cell being connected to separate output terminals, the anode of a second cell being connected to the cathode of the first cell, the cathode of the second cell being connected to the anode of the first cell, and switching means for connecting the cathode of the second cell to the cathode of the first cell and substantially simultaneously connecting the anode of the second cell to a separate output terminal said switching means being further adapted to connect the anode of the second cell to the anode of the first cell.

WILLY BORBERG.